United States Patent [19]
Daniels

[11] 3,869,105
[45] Mar. 4, 1975

[54] FURNITURE LEGS
[75] Inventor: Raymond Robert James Daniels, Kings Lynn, England
[73] Assignee: Guy Raymond Engineering Company Limited, Norfolk, England
[22] Filed: Dec. 29, 1972
[21] Appl. No.: 319,498

[30] Foreign Application Priority Data
Jan. 7, 1972 Great Britain.................... 72/890
July 12, 1972 Great Britain.................... 72/32594

[52] U.S. Cl................. 248/188.8, 16/18 R, 16/23, 16/39
[51] Int. Cl............................................ B60b 33/02
[58] Field of Search....... 248/188.8, 188.9; 16/18 R, 16/43, 18 CG, 20, 46, 30, 22, 23, 29, 38, 39

[56] References Cited
UNITED STATES PATENTS
| 498,297 | 5/1893 | Pederson ............................ 16/23 |
| 1,275,882 | 8/1918 | Ellison............................ 16/18 CG |
| 1,929,743 | 10/1933 | Jarvis et al............................ 16/38 |
| 2,170,257 | 8/1939 | Andersen........................ 16/18 CG |
| 2,992,449 | 7/1961 | Haydock.............................. 16/43 |
| 3,452,386 | 7/1969 | Carlson....................... 248/188.9 X |

FOREIGN PATENTS OR APPLICATIONS
10,311  5/1844  Great Britain..................... 16/18 R Primary Examiner—Roy D. Frazier
Assistant Examiner—Robert W. Gibson, Jr.
Attorney, Agent, or Firm—Malcolm W. Fraser

[57] ABSTRACT

A leg for attachment to an article of furniture comprising an upper leg portion, a lower leg portion and a tie rod extending through the upper leg portion and into the lower leg portion. The lower leg portion can rotate freely on the tie rod and is connected to the upper leg portion or to the tie rod and restrained from axial movement relative to the upper leg portion. The tie rod includes an annular flange located between the upper and lower leg portions so that substantially the whole of any forces applied downwardly to the tie rod or to the upper leg portion are transmitted to the lower leg portion through the flange.

1 Claim, 7 Drawing Figures

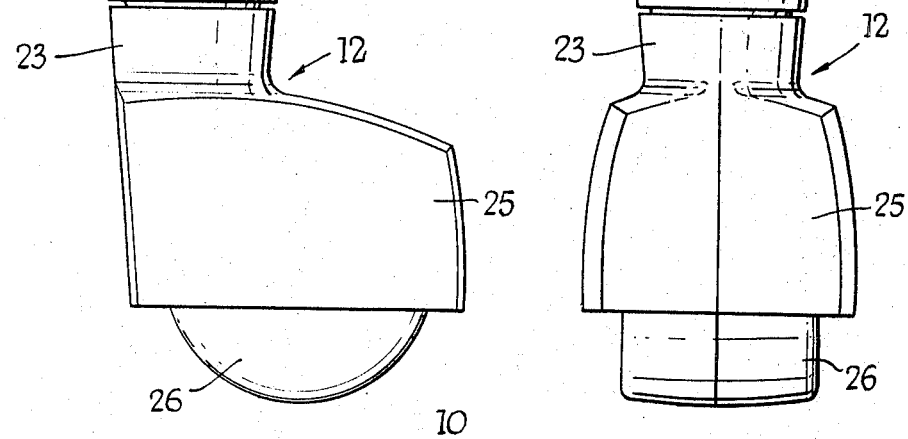

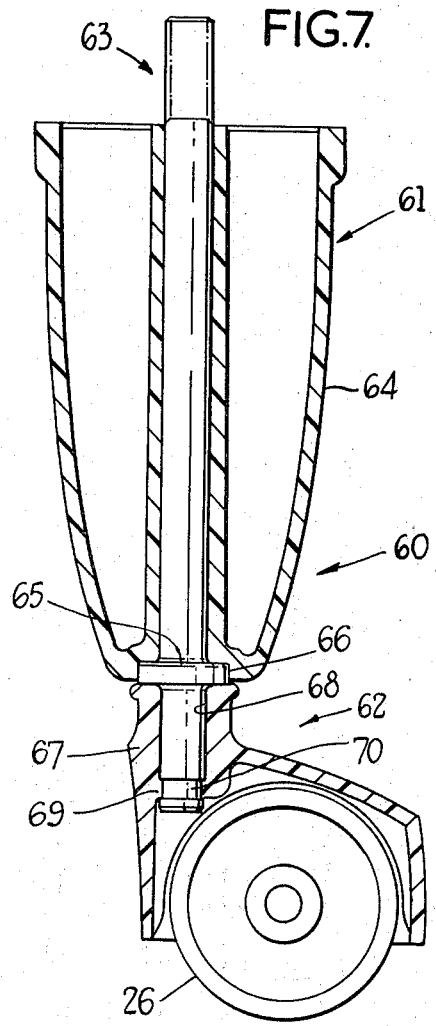

FURNITURE LEGS

BACKGROUND OF THE INVENTION

The present invention relates to an improved leg for attachment on an article of furniture such as a bed.

It is known to provide a leg for attachment to the frame of a bed in which the leg is formed either from wood or plastics material and has a spigot projecting from one end a socket mounted in the other end to receive a castor or glide. The spigot is attached in one end of the leg as a friction fit or a screw fit into a bore formed in the leg and projecting portion of the spigot is then used to threadedly or frictionally engage in a bore in the frame of the bed.

It has been found, with this conventional type of leg, that the spigot is liable to tear out in use and also that the mounting between the bottom of the leg and the castor or glide forms a second point of weakness.

This known type of leg also has the disadvantage that the castor or glide and the leg itself are supplied to the bed manufacturer or retailer as separate units and have to be assembled by the bed manufacturer or retailer which is costly in terms of labour.

It is an object of the present invention to provide a composite leg and castor or glide which has substantially increased structural strength, particularly at the joint between the leg and the castor or glide and which can be supplied as a single assembled unit.

STATEMENT OF THE INVENTION

The invention provides a leg for attachment to an article of furniture comprising an upper leg portion, a lower leg portion and a tie rod extending through the upper leg portion and into the lower leg portion, an annular flange on the tie rod located between the upper and lower leg portions whereby the lower leg portion can rotate freely on the tie rod and substantially the whole of any forces applied downwardly to the tie rod or to the upper leg portion are transmitted to the lower leg portion through the flange.

A portion of the tie rod can project from the end of the upper leg portion remote from the lower leg portion to form a spigot for attaching the leg to an article of furniture.

In order to attach the lower leg portion to the upper leg portion, the lower leg portion and the upper leg portion can be provided with snap engaging annular lip and groove elements. Alternatively, the lower leg portion can be frictionally or otherwise attached to the tie rod so as to be rotatable on the tie rod but held against axial movement.

The flange on the tie rod is preferably partially seated in a recess formed in the end face of the upper leg portion or in the end face of the lower leg portion, the depth of the recess being such that the weight supported by the leg is transmitted from the upper leg portion to the lower leg portion substantially wholly through the flange on the tie rod.

DESCRIPTION OF THE DRAWINGS

FIG. 1 is an elevation of a bed leg according to the present invention;

FIG. 2 is a side elevation of the leg shown in FIG. 1;

FIG. 3 is a plan view of the leg shown in FIG. 1;

FIG. 7 is an elevation in section of a modification of the leg shown in FIGS. 1 to 5.

DESCRIPTION OF THE PREFERRED EMBODIMENTS

Figure 4:
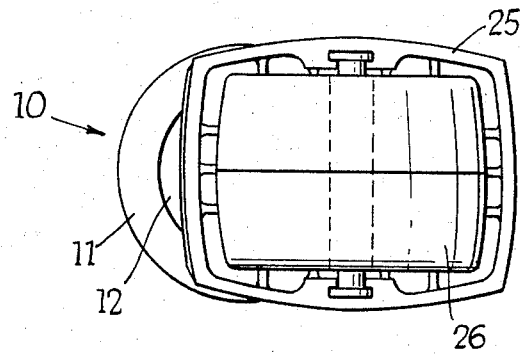
FIG. 4 is an underplan of the leg shown in FIG. 1.
Figure 5:
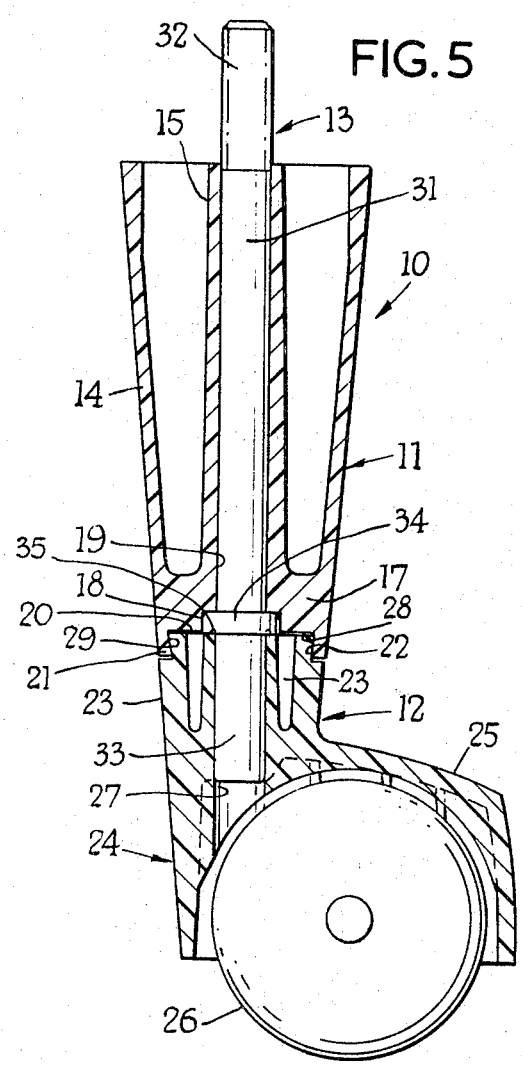
FIG. 5 is a section taken on the line V—V of FIG. 3.

In FIGS. 1 to 5 a leg suitable for attachment to the frame of a bed is indicated generally at 10. The leg 10 comprises an upper portion 11, a lower portion 12 and a tie rod 13.

The upper portion 11 of the leg 10 is formed as an injection moulding from a synthetic plastics material such as a high impact polystyrene, nylon or polypropylene and comprises an outer wall 14, which tapers downwardly, an inner cylindrical wall 15 which is joined to the outer wall by four longitudinally extending radial ribs 16 and a solid end 17.

The solid end 17 is formed with a counter sink 18 which surrounds the bottom end of a bore 19 extending through the inner wall 15. The solid end portion 17 has an annular end face 20 surrounding the counter sink 18 and itself surrounded by an upstanding circumferential wall 21 having an undercut inner surface 22.

The lower portion 12 comprises a tapered bearing portion 23 which is joined integrally to a ground engaging foot 24. The foot 24, in the embodiment shown in FIGS. 1 to 5 comprises a hollow shell 25 housing a roller 26. The shell 25 and roller 26 form a castor of the type described in the complete specification of our co-pending British Pat. Application No. 889/72, and reference should be made to that specification for a detailed description of the castor.

The bearing portion 23 is formed with a vertically extending bore 27 of the same diameter as and arranged coaxially with the bore 19 in the upper portion and which extends through the bearing portion 23 into the hollow shell 25.

The upwardly facing end of the bearing portion 23 comprises an annular end face 28 surrounding the bore 27 and adjacent the end face 28 the side wall of the bearing portion 23 is formed with a groove 29 which is adapted to accommodate the upstanding wall 21 of the upper portion 11. In order to reduce the weight and material cost of the lower portion 12 a plurality of recesses 30 are formed in the bearing portion 23.

The tie rod 13 comprises an upper bar 31, an end 32 of which is formed with a thread, a lower bar 33 and an annular bearing flange 34 between the upper bar and the lower bar.

In order to assemble the leg 10, the upper bar 31 of the tie rod 13 is passed through the bore 19 so that the threaded end 32 of the tie rod 13 projects upwardly from the upper end of the upper portion 11 and the annular flange 34 of the tie rod is seated in the counter sink 18. The depth of the counter sink 18 in relation to the dimensions of the flange 34 is such that the flange 34 projects slightly from the counter sink 18 beyond the plane of the end face 20 of the upper portion 11.

The lower portion 12 is then brought up to the lower bar 33 of the tie rod 13 which is passed into the bore 27 until the end face 28 of the bearing portion 23 engages the upstanding wall 21 on the upper portion 11. Force is then exerted on the lower portion 12 so as to expand the wall 21 outwardly and snap engage the wall 21 into the groove 29. When the wall is snap engaged around the groove end of the bearing portion 23 the upper and lower portions of the leg are firmly engaged together with a small clearance between the end faces 20 and 28 but with the annular flange 34 of the tie rod lightly clamped between the bottom of the counter sink 18 and the end face 28 of the lower portion 12.

When the upper and lower portions of the leg 10 are engaged together, the lower portion can freely rotate about the tie rod 13, swivelling about the lower bar 33, and a small groove 35 is formed in the flange 34 around the lower bar 33 to ensure free rotation of the lower portion 12 about the lower bar 33.

The assembled leg 10 can then be readily attached to the frame of a bed or other article of furniture by threadedly engaging the end 32 of the tie rod 13 in a threaded bore provided in the frame of the bed.

It will be seen that the tie rod 13, which is preferably formed from cold forged steel extends throughout the length of the leg and in particular extends through the joint formed between the upper and lower portions of the leg. Any weight exerted on the leg is passed through the walls of the upper portion 11 and the ribs 16 to the annular flange 34 of the tie rod and thence to the bearing portion 23 of the lower portion 12. In this manner all of the vertical or lateral stress created by the weight of the bed or other article of furniture passes through the tie rod. Because the tie rod extends through the whole length of the leg and the flange 34 is trapped between the two portions of the leg the danger of the tie rod tearing out of the leg under the stresses to which the leg will normally be subjected in use is eliminated or at least substantially reduced.

It will be appreciated that the foot 24 need not necessarily be formed as a castor and can comprise a glide or a conventional end stop.

Figure 6:
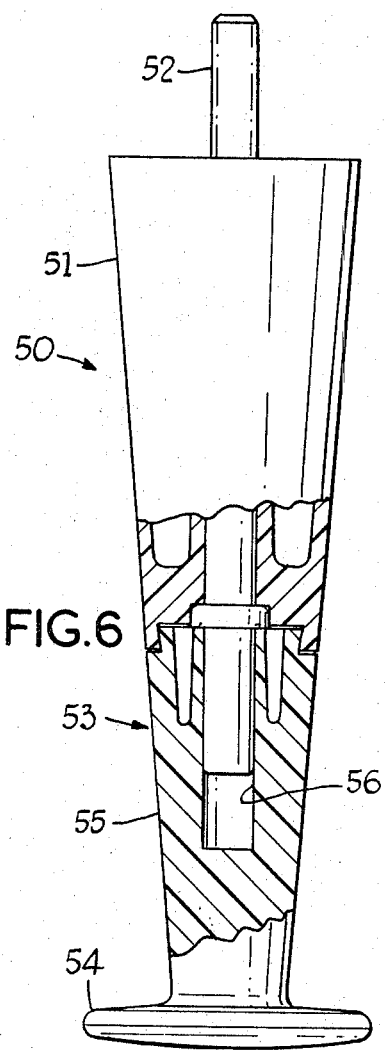
FIG. 6 is an elevation partly in section showing a modification of the leg shown in FIG. 1.

An illustration of a further embodiment of the present invention in which a leg is provided with a foot in the form of a glide is illustrated in FIG. 6. In FIG. 6 a leg is indicated generally at 50 which comprises an upper portion 51 and a tie rod 52 identical to the upper portion 11 and tie rod 13 of the leg 10 and a lower portion 53.

The lower portion 53 is a unitary injection moulding of a synthetic plastics material and comprises a disc-shaped ground engaging foot in the form of a glide 54 and a bearing portion 55 which is externally tapered and which is formed with a central cylindrical bore 56 which is co-axial with the bore in the upper portion 51.

The lower portion 53 is rotatably mounted on the rod 52 and is attached to the upper portion 51 in the same manner as the embodiment of FIGS. 1 to 5, the weight of any article supported on the leg 50 being transmitted through the tie rod 52 to the glide 54.

In FIG. 7 of the drawings, a furniture leg is indicated generally at 60 which is a further modification of the leg 10 of FIGS. 1 to 5. The leg 60 comprises an upper leg portion 61, a lower leg portion 62 and a tie rod 63 which extends through the upper leg portion 61 and into the lower leg portion 62.

The upper leg portion 61 is similar to the upper leg portion of the leg 10 except that it has an outer wall 64 which is convexly tapered downwardly towards the lower leg portion 62.

The tie rod 63 is similar to the tie rod of the leg 10 and has a flange 65 which is located between the upper leg portion 61 and the lower leg portion 62 and is partially housed in a recess 66 formed in the end of the upper leg portion 61.

The lower leg portion 62 is formed with a boss 67 having a bore 68, but is otherwise similar to the lower leg portion of the leg 10. The bore 68 is formed with an annular rib 69 which is positioned well below the upper end of the boss 67 and the tie rod 63 is provided with a groove 70 which interengages with the rib 69 to retain the lower leg portion 62 on the tie rod.

The distance between the flange 65 and the groove 70 is approximately the same as the distance between the upper end of the boss 67 and the rib 69 so that the flange 65 is held lightly against the upper end of the boss when the rib is located in the groove, but can rotate freely on the tie rod relative to the upper leg portion.

In all other respects the leg 60 is similar to the leg 10 and any downwardly directed force applied to the tie rod 63 or to the upper leg portion 61 is transmitted to the lower leg portion 62 through the flange 65 of the tie rod. Furthermore any lateral stresses placed on the leg are taken by the tie rod and not by the upper and lower leg portions.

It will be appreciated that other means for attaching the lower leg portion can be employed, for instance the rib and groove arrangement can be reversed so that the rib is provided on the tie rod and the groove is formed in the surface of the bore 68. Alternatively the tie rod can project downwardly below the end of the bore 68 and a conventional circlip used to retain the lower leg portion in position on the tie rod.

Further minor modifications can be made to the above described embodiment without departing from the spirit and scope of the invention which is best described in the following claims.

What I claim is:

1. A leg for attachment to an article of furniture comprising an upper leg portion, a lower leg portion and a tie rod extending through the upper leg portion and into the lower leg portion, an annular flange on the tie rod located between the upper and lower leg portions whereby the lower leg portion can rotate freely on the tie rod and substantially the whole of any forces applied downwardly to the tie rod or to the upper leg portion are transmitted to the lower leg portion through the flange, snap engaging annular lip and groove elements on said lower leg portion and said upper leg portion, respectively, for axially retaining said lower leg portion on said upper leg portion and enabling said lower leg portion to be rotatable relative to said upper leg portion and to be axially disengageable therefrom under normal working conditions.

* * * * *